United States Patent [19]
Odawara et al.

[11] Patent Number: 5,136,857
[45] Date of Patent: Aug. 11, 1992

[54] AIR CONDITIONING SYSTEM FOR USE IN AEROPLANE HANGAR

[75] Inventors: Shiro Odawara, Oomiya; Keiichi Ito, Tokyo; Kazushi Kobayashi, Asaka, all of Japan

[73] Assignee: Taikisha Ltd., Tokyo, Japan

[21] Appl. No.: 710,570

[22] Filed: Jun. 5, 1991

[30] Foreign Application Priority Data

Jun. 7, 1990 [JP] Japan .................................. 2-149695

[51] Int. Cl.$^5$ .............................................. B64F 5/00
[52] U.S. Cl. ......................................... 62/263; 454/64; 454/53; 62/259.1; 62/441
[58] Field of Search ................... 62/440, 441, DIG. 5, 62/259.1, 263, 258; 98/115.2, 115.1

[56] References Cited

U.S. PATENT DOCUMENTS

| | | | |
|---|---|---|---|
| 2,513,517 | 7/1950 | Reilly | 62/259.1 |
| 2,757,597 | 8/1956 | Ward et al. | 98/115.2 |
| 2,829,582 | 4/1958 | Abbott et al. | 98/115.2 |
| 3,168,030 | 2/1965 | Wilhelmsson et al. | 98/115.2 |
| 3,563,004 | 2/1971 | Schouw | 98/115.1 |
| 3,708,934 | 1/1973 | Jones | 52/236.1 |
| 3,906,691 | 9/1975 | Grenet | 52/236.1 |
| 3,963,416 | 6/1976 | Mach | 98/115.1 |
| 4,714,010 | 12/1987 | Smart | 98/115.1 |

OTHER PUBLICATIONS

Finishing Highlights, *Product Finishing*, p. 40, Jun. 1989.
BA Inaugurates Automated Paint Bay, *Aircraft Maintenance International*, p. 6, Jan. 1989.
Ventilation Vital For 747 Parts Finishing, *Heating, Piping & Air Conditioning*, pp. 63-68, Jul. 1970.
Spray Coating System Earns Its Wings, *Industrial Finishing*, pp. 18-19, Sep. 1986.

*Primary Examiner*—Albert J. Makay
*Assistant Examiner*—William C. Doerrler
*Attorney, Agent, or Firm*—Webb, Burden, Ziesenheim & Webb

[57] ABSTRACT

An air conditioning system for use in an aeroplane hangar. The hangar includes a fuselage work area for works on a fuselage of an aeroplane and a main-wing work area for works on a main wing of the aeroplane, with the work areas being partitioned by a partition wall. An air conditioning device is provided for conditioning temperature of air to be fed to either work area. Further, a recycling device is provided for cleaning air exhausted from the one area and then feeding the cleaned air to the other area.

12 Claims, 9 Drawing Sheets

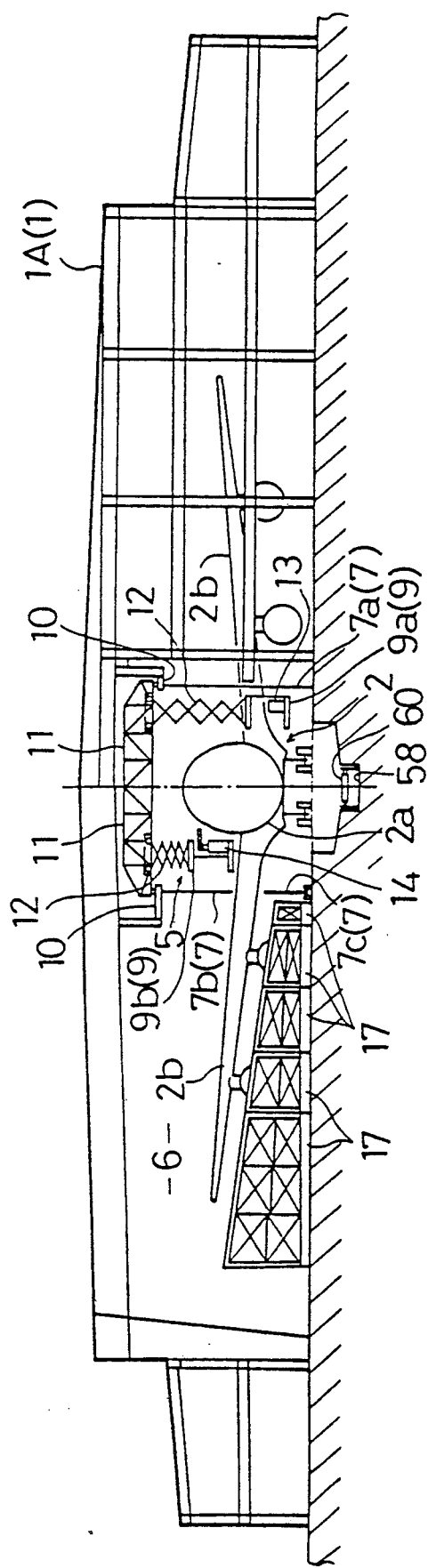

AIR CONDITIONING SYSTEM FOR USE IN AEROPLANE HANGAR

BACKGROUND OF THE INVENTION

1. Field of the Invention

The present invention relates to an air conditioning system for use in an aeroplane hangar, and more particularly to an air conditioning system of the above type for maintaining good working environment for workers engaged in various works on an aeroplane parked at the hangar.

2. Description of the Related Art

A conventional air conditioning system for an aeroplane hangar is shown in FIGS. 12 and 13. In this system, a plurality of air vents 27' for venting air are disposed at appropriate positions inside an aeroplane hangar 1. Further, air conditioning machines 24' for conditioning the temperature of introduced ambience air are provided inside the hangar 1. Accordingly, the air conditioned by the air conditioning machines 24' is distributed to the air vents 27' to be vented therefrom.

For air exhaust, the system further includes, at appropriate positions, a plurality of air exhaust units 28' for collecting the room air and exhausting the collected air out of the hangar.

With the above-described conventional system, if e.g. a spray painting operation is conducted on a fuselage 2a of an aeroplane 2, spray mist and/or solvent gas is scattered about inside the hangar 1, thus imparing working environment for other workers engaged in e.g. maintenance of a main wing 2b. Further, if the deterioration of the working environment is serious, the works at the other sections must be suspended until completion of the spray painting operation. This results in significant delay in the entire working schedule.

In an attempt to overcome this inconvenience, the prior art has suggested use of partitions for surrounding the spray painting work site around the fuselage 2a while effecting air-conditioning (i.e. air ventilation and air exhaust operations) separately for the partitioned areas 2a, 2b. That is, the system effects the air-conditioning operations separately for the partitioned areas 2a, 2b by separately introducing the ambience air into the areas 2a, 2b and exhausting the room air therefrom.

In either system; however, the system must condition the temperature of an enormous amount of the ambience air having great load against the conditioning so as to distribute this conditioned air to the air vents 27' dispersed in the vast interior of the hangar which is large enough to accommodate the aeroplane 2. Therefore, the system consumes a great amount of energy.

The primary object of the present invention is to provide an improved system of the above-described type which system can achieve improvement of working conditions while significantly reducing the energy consumption of the system through rationalization of the air conditioning system suited for use in the hangar where various works are done on an aeroplane parked therein.

SUMMARY OF THE INVENTION

For accomplishing the above-noted object, an air conditioning system for use in an aeroplane hangar relating to the present invention comprises:

a hangar including a fuselage work area for works on a fuselage of an aeroplane and a main-wing work area for works on a main wing of the aeroplane;

a partition wall for partitioning between said fuselage work area and said main-wing work area;

an air conditioning device for conditioning temperature of air to be fed to either of said work areas; and a recycling device for cleaning air exhausted from said either area and then feeding the cleaned air to said other area.

Functions and effects of the above-described construction will be described next.

The recycling device can effectively utilize the heat (the cold heat in case the air conditioning device cools the air or the hot heat in case the air conditioning device warms the air) retained in the exhaust air from one area, e.g. the fuselage work area, in order to condition the temperature of the air to be fed to the other area, i.e. the main-wing work area. The use of the retained heat can save much of the energy required for conditioning the temperature of the air to be fed to the other area. Further, the recycling device first cleans the exhaust air before conditioning the temperature thereof. Therefore, if the air becomes contaminated with harmful substance such as spray mist, dust and so on at the one work area, the recycling device cleans this contaminated air, thus preventing the harmful substance from entering into the other work area. Further, intrusion of the substance into the other work area is prevented also by the presence of the partition wall as well as pressure difference existing between the two partitioned work areas. Thus, the invention's system is advantageous not only for saving consumption of energy for temperature conditioning but also for preventing scattering of harmful substance throughout the entire interior of the hangar. Further, as a result of the above effects, the works at one area can be done without having to suspend the works at the other area, thus shortening the entire working schedule. In particular, the amount of the energy conservation obtained by the invention's system is enormous because of the vastness of the interior of the hangar which has to accommodate the aeroplane.

Conceivably, part of the heat retained in the exhaust air from one work area may be recycled to the air conditioning device so that the retained heat can be utilized also for the air conditioning of this area, i.e. for conditioning the temperature of newly introduced ambience air. In this case too, there occurs no recycling of the harmful substance to this area since the substance contained in the exhaust air is eliminated by the recycling device before the air is recycled to the air conditioning device.

Further and other objects, features and effects of the invention will become more apparent from the following more detailed description of the embodiments of the invention with reference to the accompanying drawings.

BRIEF DESCRIPTION OF THE DRAWINGS

Accompanying drawings FIGS. 1 through 11 illustrate one preferred embodiment of an air conditioning system for an aeroplane hangar relating to the present invention; in which, FIG. 1 is a plane view showing a structure of an aeroplane hangar, FIG. 2 is a vertical section, FIGS. 3 and 4 are plane views showing an interior construction of the hangar, respectively, FIGS. 5 through 7 are sections, taken at longitudinal positions of a fuselage work area and of an empennage work area, respectively, FIGS. 8 and 9 are plane views illustrating uses of working tables inside the hangar, FIG. 10 is a system view of an air ventilation system, FIG. 11 is a system view of a drainage system.

DESCRIPTION OF THE PREFERRED EMBODIMENTS

Preferred embodiments of an air conditioning system for an aeroplane hangar relating to the present invention will now be described in details with reference to the accompanying drawings.

Figure 1:
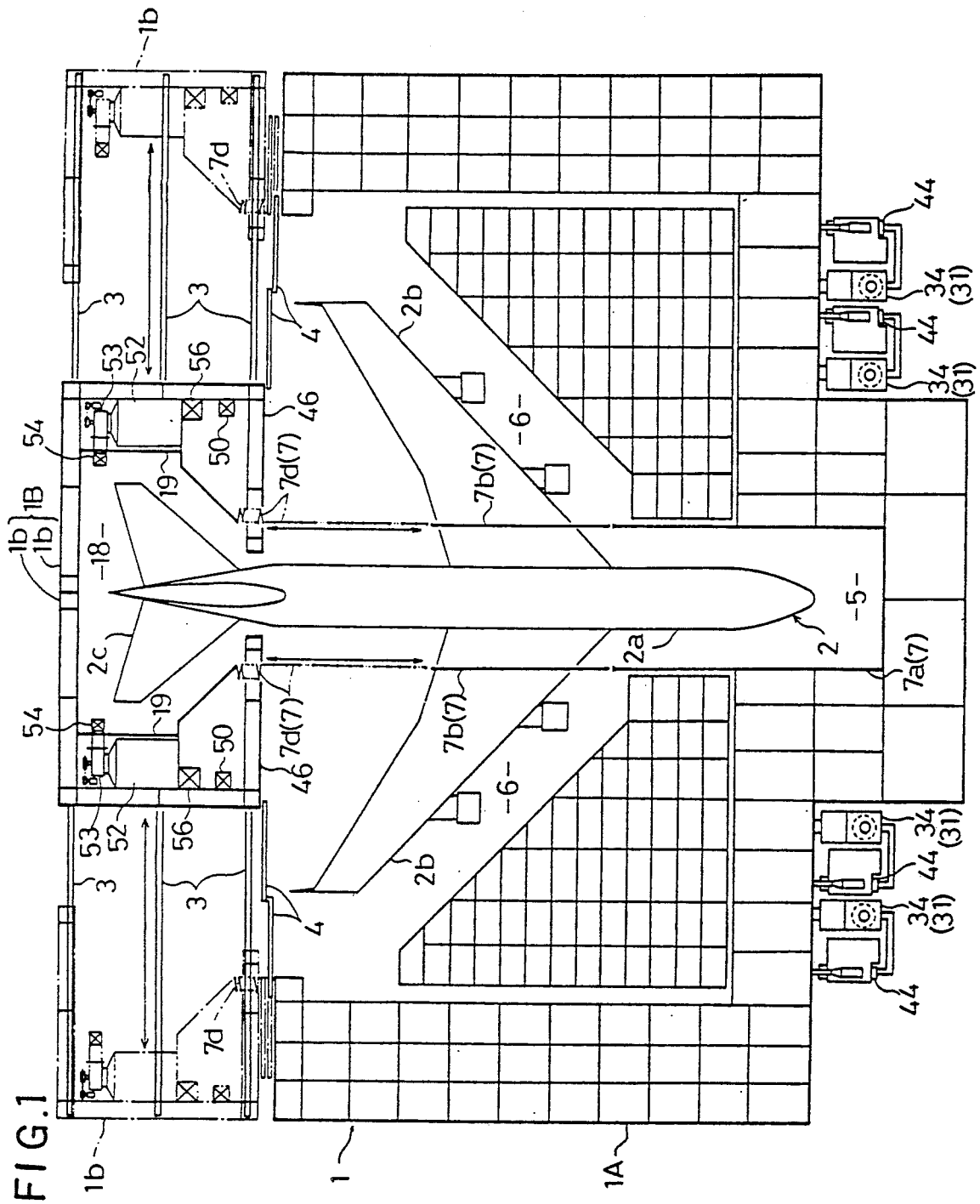
Figure 2:
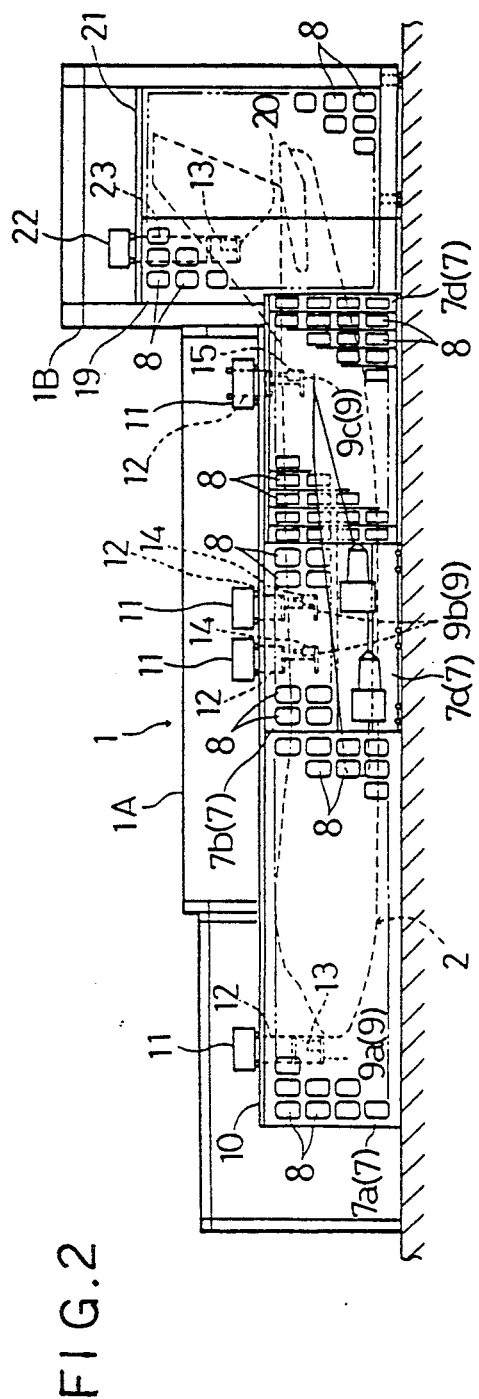

Referring to FIG. 1, a reference numeral 1 denotes a hangar for accommodating an aeroplane 2 to effect works such as re-painting job on this aeroplane 2. This hangar 1 is so designed as to introduce the aeroplane 2 from its nose.

More particularly, the hangar 1 includes a main area 1A for receiving a fuselage 2a and a main wing 2b of the aeroplane 2 and an empennage area 1B disposed adjacent an entrance to the main area 1A so as to receive an empennage 2c of the aeroplane 2. The empennage area 1B has a greater height than the main area 1A so as to accommodate the vertically extending empennage 2c.

Further, the empennage area 1B has a shorter width than the main area 1A and is divided widthwise into two sections 1b, 1b for allowing introduction of the fuselage 2a and the main wing 2b into the main area 1A. These sections 1b, 1b are movable combined into the one area 1B between an accommodating position (denoted with a solid line) where the sections 1b, 1b become united for accommodating the empennage 2c and a retracted position (denoted with an detached line) where the sections 1b, 1b are separated from each other for allowing therethrough the introduction of the fuselase 2a and the main wing 2b into the main area 1A.

A reference numeral 3 denotes a guide mechanism for guiding the above-described movements of the sections 1b. Further, a reference numeral 4 denotes an auxiliarly gate for allowing entrance and exit of the main wing 2b into and out of the main area 1A.

With the above-described construction of the main area 1A and the empennage area 1B, compared with the conventional construction where the entire hangar 1 has the long width corresponding to the main wing 2b and the long height corresponding to the empennage, it becomes possible to reduce the construction costs of the entire hangar 1 and also to reduce the installation and running costs of the ventilation and air conditioning system inside the hangar 1.

In the main area 1A of the hangar 1, there is provided a partition wall 7 for sectioning this area 1A into a fuselage work area 5 for works on the fuselage 2a accommodated therein (including also the nose of the aeroplane, in this particular embodiment) and a main-wing work area 6 for works on the main wing 2b. As this partition wall 7 sections the area 1A into the fuselage work area 5 and the main-wing work area 6, it is possible to simultaneously effect different works at the respective areas 5, 6 without the work at one area disadvantageously affecting that at the other area.

The partition wall 7 is movable between a partitioning position (the position shown in the drawings) where the wall 7 is positioned across the fuselage 2a through the entire length thereof and a retracted position where the wall 7 is retracted for allowing unobstructed entrance and exit of the aeroplane 2. More particularly, the partition wall 7 includes a top wall portion 7a positioned across the fuselage 2a forwardly of the main wing 2b and a central upper wall portion 7b positioned across the fuselage 2a upwardly of the main wing 2b. These wall portions 7a and 7b are fixedly installed since the portions 7a, 7b do not interfere with the movement of the aeroplane 2 when the partition wall 7 is placed at the partitioning position. The partition wall 7 further includes a central lower portion 7c positioned across the fuselage 2a downwardly of the main wing 2b and a rear wall portion 7d positioned across the fuselage 2a rearwardly of the main wing 2b. These wall portions 7c and 7d are constructed as movable since the portions 7c, 7d interfere with the movements of the aeroplane 2 when the partition wall 7 is placed at the partitioning position.

Specifically, the central lower wall portion 7c has right and left sides thereof independently movable by means of e.g. casters each between the partitioning position and the retracted position. The rear wall portion 7d has a foldable construction guided on upper and lower rail type guide mechanisms. That is, at the partitioning position, right and left sides of this rear wall portion 7d are folded out to partition the rear sides of the fuselage 2a. On the other hand, at the retracted position, the right and left sides of the rear wall portion 7d are folded in to a predetermined storing position adjacent the empennage work area 1B. The right and left sides of this rear wall portion 7d are independently movable. Also, the retracting movement of this rear wall portion 7d, at its retracted, i.e. folded storing, position, is associated with the movement of the respective sections 1b to their retracted positions in the empennage area 1B.

Incidentally, at the respective portions of the partition wall 7, there are provided a plurality of transparent glass windows 8 for allowing entrance of light into the hangar 1 and allowing also monitoring of the works at the fuselage work area 5 from the outside.

In the fuselage work area 5, separately of the partition wall 7 at its partitioning position, there are provided working tables 9 movable inside this fuselage work area 5, so that various works on the fuselage 2a can be effected efficiently by the free movements of the working tables 9.

Referring more particularly to the movable construction of the working tables 9, at a ceiling portion of the hangar 1 and at positions corresponding to side edges of the fuselage work area 5, there are provided a pair of rails 10 extending along the entire length of the fuselage work area 5 and a plurality of transverse frames 11 disposed between the rails 10 and movable on these rails 10 along the longitudinal direction of the fuselage 2a. Further, from each transverse frame 11, a pair of vertically expandable frames 12 are continuously extended for the right and left sides of the fuselage 2a, and the working tables 9 are attached respectively to lower ends of these vertically expandable frames 12.

In operation, each working table 9 is moved longitudinally of the fuselage 2a as being guided on the rails 10 of the transverse frame 11. Also, the table 9 is moved vertically of the fuselage 2a as being guided by expanding and contracting motions of each vertically expandable frame 12. Further, the table 9 is moved across the width of the fuselage 2a through the movements of the expandable frame 12 relative to the transverse frame 11.

As described above, since a plurality of the transverse frames 11 are provided and also a plurality of the working tables 9 are dispersed along the length of the fuselage 2a, various works on the fuselage 2a can be effected independently at the further sectioned work zones sectioned in the fuselage work area 5 along the length of the fuselage 2a.

Of the working tables 9 installed in the fuselage work area 5, a pair of working tables 9a positioned beside the nose of the aeroplane 2 mount painting machines 13 with which maintenance workers effect manual painting operations on the fuselage 2a. Further, each of the above working tables 9a includes a working space for allowing the maintenance worker to effect the manual work. On the other hand, two working tables 9b, which are placed at longitudinally intermediate positions relative to the fuselage 2a, each mounts a one-hand robot type automatic painting machine 14 for effecting automatic painting operation on the side peripheral faces of the fuselage 2a and also a working space for the worker to effect other works.

Further, a working table 9c placed adjacent a side of the empennage mounts also a one-hand robot type automatic painting machine 15 for effecting automatic painting operation on an upper peripheral face of the fuselage 2a and also a working space for the worker to effect other works.

Figure 8:
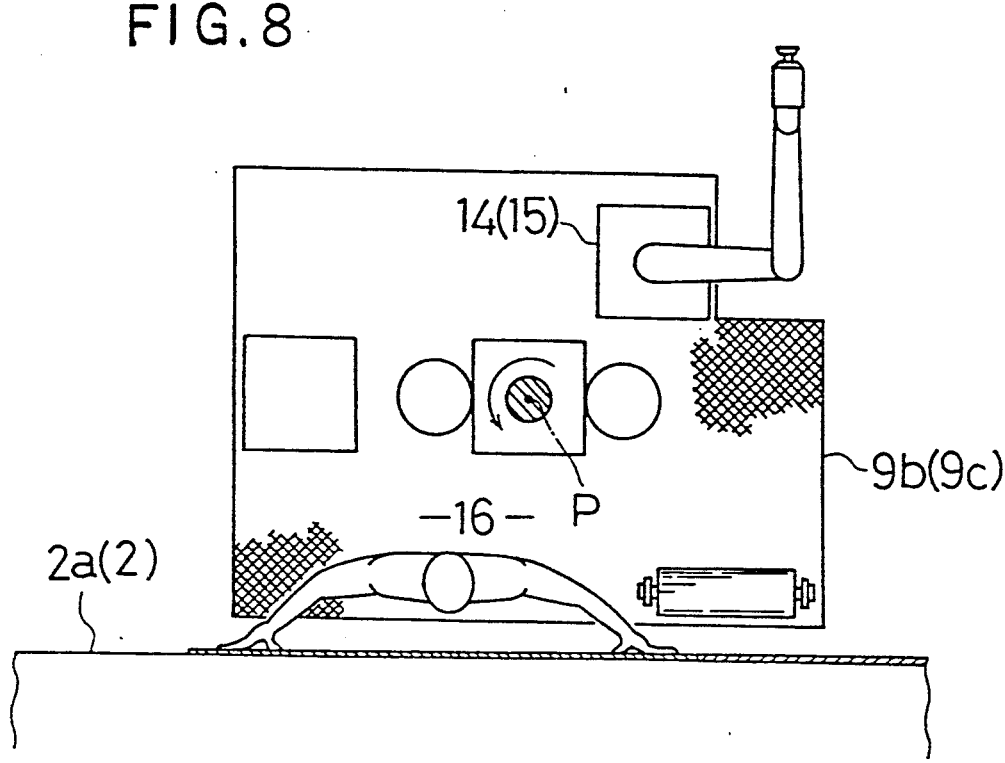
Figure 9:
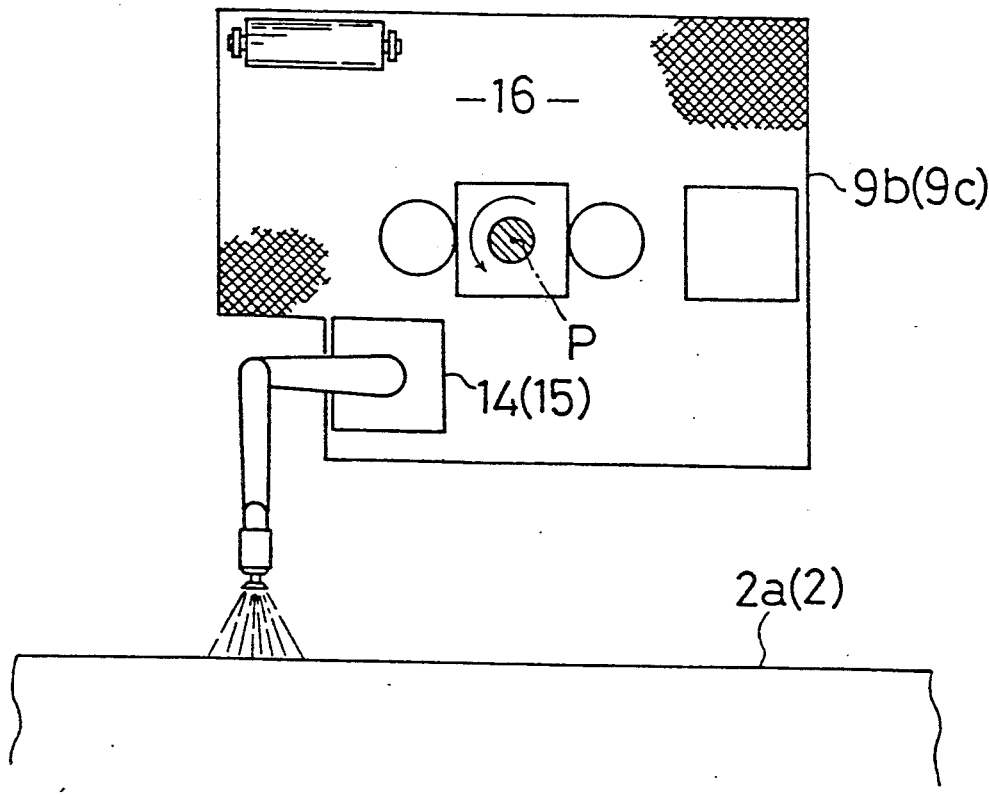

Referring more particularly to the working tables 9b, 9c mounting the automatic, side painting machine 14 and the automatic, top painting machine 15, as illustrated in FIGS. 8 and 9, the machines 14, 15 and the working spaces 16, 16 are disposed side by side on the working tables 9b, 9c, respectively. Further, these working tables 9b, 9c are so attached to the vertically expandable frames 12, 12 that the tables 9b, 9c are selectably positioned through pivotal movement of the tables 9b, 9c about a central vertical axis P between an automatic painting position (shown in FIG. 9) where the side adjacent the automatic painting machine 14 (15) is oriented toward the fuselage 2a and a manual working position (shown in FIG. 8) where the other side adjacent the working space is oriented toward the fuselage 2a. Accordingly, during an automatic painting operation, the supervising worker standing at the working space 16 will not interfere with the automatic painting operation of the automatic painting machine 14 (15). Similarly, during a manual work, the worker can efficiently effect the work without being interfered with by the presence of the automatic painting machines 14, 15.

In the main-wing work area 6, there are provided a floor-moving type working tables 17 movable on the floor of this work area 6. These working tables 17 mount various kinds of work devices, so that various works such as maintenance of an aeroplane engine and painting works can be effected on these working tables 17.

Further, each of these working tables 17 installed in the main-wing work area 6 has a lift mechanism for allowing adjustment of height of the table 17 depending on the work to be effected thereon.

In the empennage area 1B, there are installed inner walls 19 for surrounding the empennage work area 18 adjacent the empennage 2c accommodated therein. Further, there are provided working tables 20, which are movable in this empennage area 1B, on the opposed sides of the empennage. These working tables 20 include various painting devices 13 for effecting manual painting operations on the empennage 2c and working spaces for the workers to effect other works on the empennage 2c.

The moving construction of the working tables 20 in the empennage area 18 is substantially the same as that employed for moving the working tables 9 of the fuselage area 5. That is, vertically expandable frames 23 are extended from a pair of right and left transverse frames 22 movable along the longitudinal direction of the fuselage 2a, so that the expandable frames 23 can freely move along the width of the fuselage 2a. And, the working tables 20 are attached respectively to lower ends of these vertically expandable frames 23.

The right and left inner walls 19 for surrounding the empennage area 18 and the right and left working table moving mechanisms 20, 21, 22, 23 extending from the rails 21 to the working tables 20 are provided separately in the right and left sections 1b. Then, for allowing movement of the fuselage 2a and the main wing 2b in and out of the main area 1A, these right and left inner walls 19 and the working table moving mechanisms 20, 21, 22 and 23 are moved together with the respective sections 1b.

Figure 10:
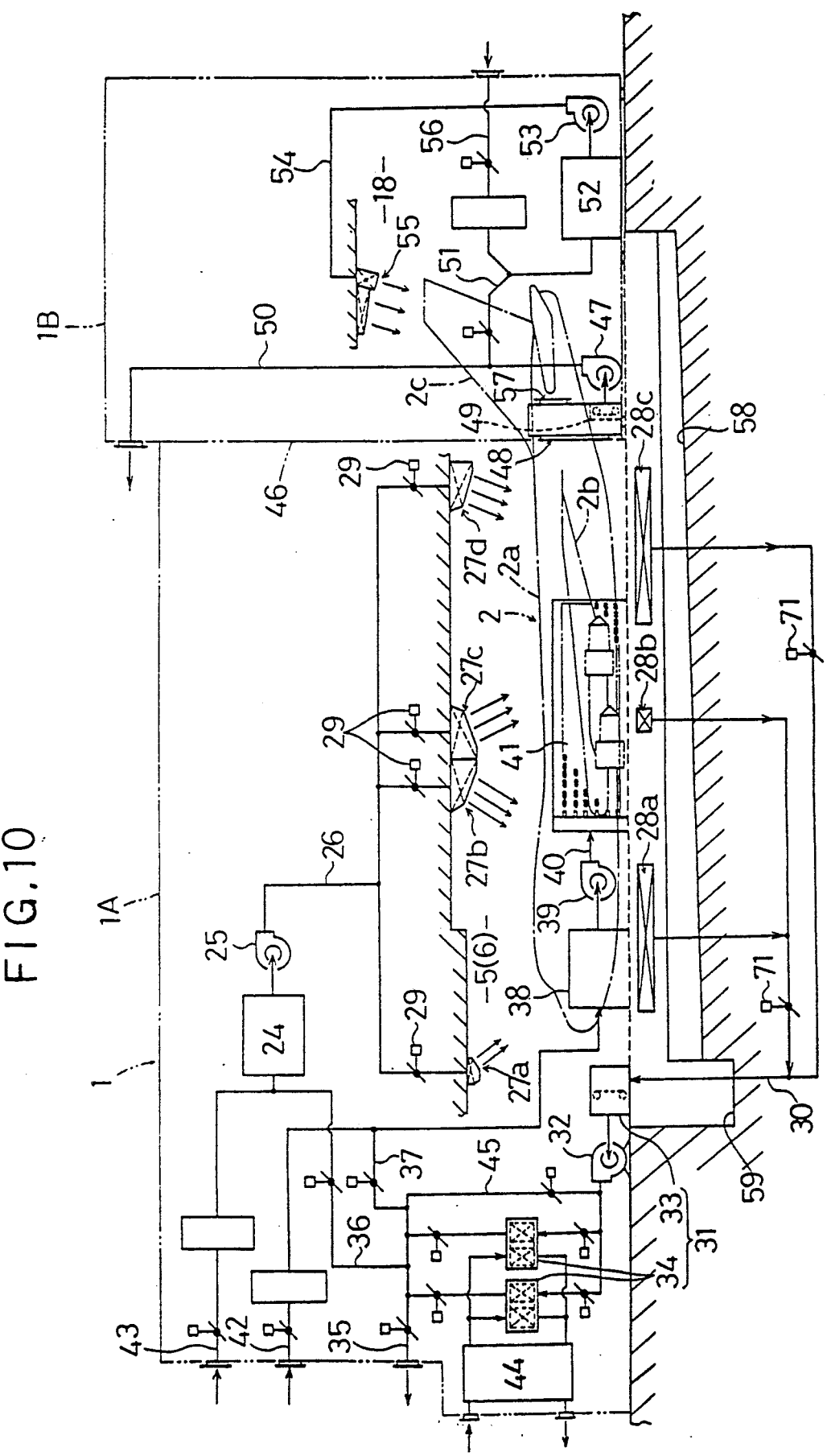
Figure 12:
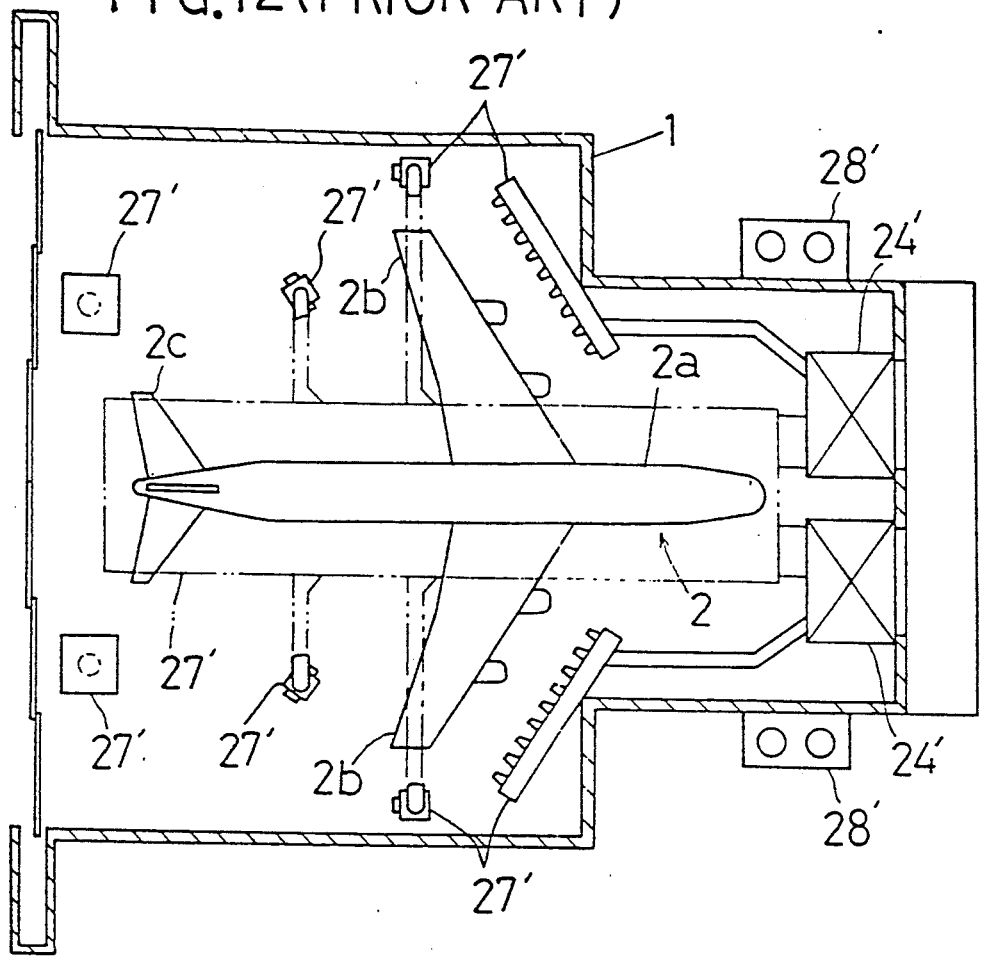
FIGS. 12 and 13 are a plane view and a section view showing a conventional system.
Figure 13:
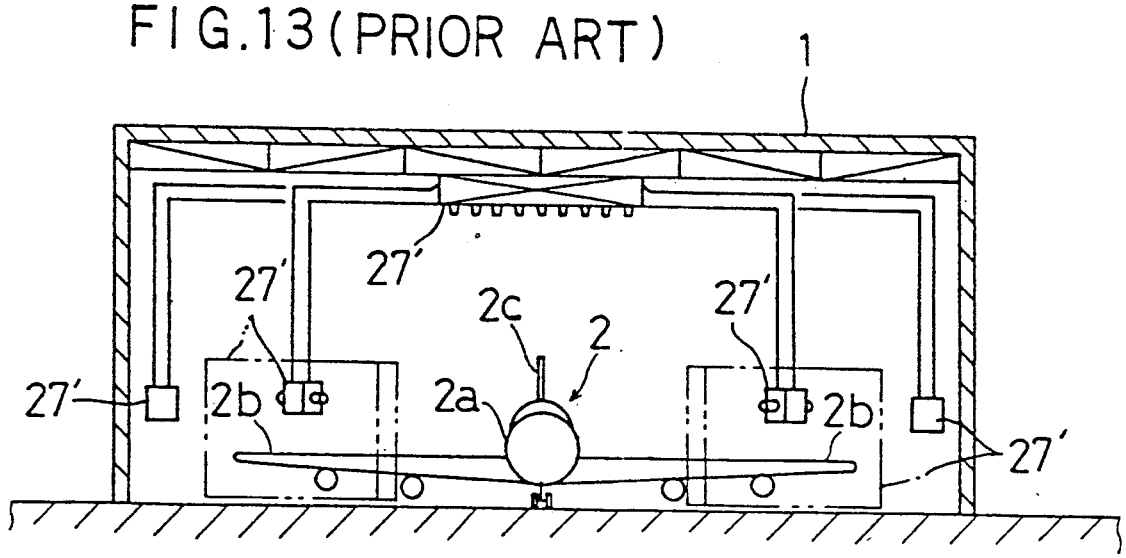

Next, a ventilation and air conditioning system for the fuselage work area 5 will be described with reference to FIG. 10. As shown, a main air conditioning device 24 is provided for cleaning and conditioning the temperature of air to be fed to the fuselage work area 5. At the ceiling portion corresponding to the fuselage work area 5, there are arranged, along the length of the fuselage 2a, a plurality of fuselage air vent openings 27a, 27b, 27c, and 27d for receiving the air from the main air conditioning device 24 to feed it into the fuselage work area 5 through air feed fans 25 and air feed passages 26. On the other hand, at the floor portion corresponding to the fuselage work area 5, there are provided floor air inlet openings 28a, 28b and 28c at positions extending along the peripheral edge of the fuselage work area 5 and adjacent opposed ends of the fuselage 2a and at a position corresponding to the longitudinal center of the fuselage 2a, respectively.

In operation, the dust-eliminated and temperature-conditioned air is fed through the fuselage air vent openings 27a, 27b, 27c and 27d disposed at the ceiling zone and by the air sucking function of the openings 28a, 28b and 28c, the air is forcibly exhausted into these air inlet openings 28a, 28b and 28c disposed at the floor zone together with harmful substance (e.g. spray mist, solvent gas and dust) generated inside this fuselage work area 5. In short, according to this air conditioning system, there is forcibly generated the downward air flow inside the fuselage work area 5, which is partitioned from the main-wing work area 6 by means of the partition wall 7 so as to avoid disadvantageous inflow of the harmful substance into the latter area 6. Consequently, the system can effectively achieve improvement of the working environment inside the fuselage work area 5.

Further, the working tables 9 disposed in this fuselage work area 5 are movable in contrast with the conventional system where the tables have a vertically multi-stage construction extending through the entire length of the fuselage 2a. This movable construction is advantageous for preventing the above-described forcible air flow from being interfered with by the presence of these working tables 9, whereby the system can further improve the working environment of the fuselage work area 5 in this respect.

The air vent openings 27a, 27b, 27c and 27d and the air inlet openings 28a, 28b and 28c are switchable, by remote control operations on a dumper 29 incorporated in the air feed passage 26 and a further dumper 71 incorporated in the air exhaust passage 30, between a condition where the vent openings 27a, 27b and the inlet openings 28a and 28b positioned forwardly in the longitudinal direction of the fuselage 2a are used for the air venting and air sucking actions respectively and a further condition where the other vent openings 27c and 27d and the other inlet opening 28c are used for these actions respectively. With this arrangement, the system can further effectively improve the working environment of the fuselage work area 5 by utilizing the forcible, i.e. push-pull air flow while minimizing the area of necessary air conditioning, so that the system can save consumption of the energy needed for the air conditioning operation. This, in turn, means that the system can be formed compact and of a smaller capacity for achieving the same air conditioning effect.

For conditioning the air of the main-wing work area 6, there is provided an air recycling device 31 for cleaning the exhaust air from the fuselage work area 5 and then feeding this cleaned air to the main-wing work area 6. More particulary, the air recycling device 31 consist essentially of a dust eliminating device 33 for eliminating dust from the exhaust air introduced from the fuselage work area 5 through the air openings 28a, 28b and 28c by means of an air exhaust fan 32 of a rotary adsorbing/desorbing type air disposing device 34 for separating and eliminating permeable harmful substance such as solvent gas still contained at the air from the dust eliminating device 33.

For utilizing the air cleaned by the recycling device 31 as the air to be fed to the main-wing work area 6, the cleaned air is divided into three air flows. That is, one of these air flows is exhausted, as cleaned exhaust air, out of the hanger 1 through the air exhaust passage 35. Another air flow is recycled to the main air conditioning device 24 desribed hereinbefore. And, the other air flow is quided to a main-wing area air conditioning device 38 through a relay passage 37, so that this air conditioning device 38 again eliminates remaining dust from and conditions the temperature of this air flow portion to feed it as ventilation air to main-wing area air vent openings 41 through an air feed passage 40 by means of a further air feed fan 39.

The main-wing air conditioning device 38 receives, in additions to the cleaned air from the recycling device 31, fresh ambience air introduced through an ambience air inlet passage 42, with these airs being combined together and the device 38 effects the dust eliminating operation and the temperature condition's operation on this combined air flow to feed it to the main wing work area 6. As desribed above, the exhaust air from the fuselage work area 5 is cleaned by the recycling device 31 and this cleaned air is utilized as a part of the air to be fed to the main wing work area 6. Accordingly, the system can effectively utilize the heat (cold heat in case the main air conditioning device 24 cools the air, or hot heat in case the conditioning device 24 warms the air) retained in the exhaust air from the fuselage work area 5, thus saving consumption of energy needed for conditioning the temperature of the air to the main wing work area 6 by an amount corresponding to the amount of heat retained in the exhaust air. Consequently, the system can employ a compact and small capacity conditioning device as the main wing area air conditioning device 38.

Moreover, the main air conditioning device 24 receives, in addition to the cleaned air flow portion from the recycling device 31, fresh ambience air introduced through an ambience air inlet passage 43, with the airs being combined together, so that the main air conditioning device 24 effects dust eliminating operation and the temperature conditioning operation on this combined air flow. That is, the main conditioning device 24 can effectively utilize the exhaust air fed after cleaning from the recycling device 31 as a portion of the air to be fed to the fuselage work area 5. As a result, compared with the conventional system which conditions the entire amount of ambience air for feeding it to the fuselage work area 5, the system of the present invention can effectively utilize the heat retained in the exhaust air from the main wing work area 6, thus saving consumption of the energy needed for conditioning the temperature of the air to the fuselage work area 5 by an amount corresponding to the amount of heat retained in the exhaust air. Consequently, the system can employ a compact and small capacity conditioning device as the main wing area air conditioning device 38.

The main-wing area air vent openings 41 for feeding to the main wing work area 6 the air dust-eliminated and temperature-conditioned through the main wing area air conditioning device 38 are so arranged as to vent the air with rearward or obliquely rearward orientation towards the main wing 2b from the front portion of the main wing 2b and through the entire width of the main wing 2b. Accordingly, these air vent openings 41 can feed the air only to the vicinity around the main wing in a concentrated manner. As a result, in this main wing work area 6 too which is larger than the fuselage work area 5, the system can effectively improve the working environment for the workers engaged in various works on the main wing 2b with very small amount of air flow.

A reference numeral 44 in the drawings denotes a catalytic combustion device for incinerating the desorbed harmful substance such as the solvent gas which has been separated from the exhaust air through the rotary adsorbing/desorbing type air treating device 34 and been combined with a high-temperature air for desorption.

A reference numeral 45 denotes a bypass passage for the rotary adsorbing/desorbing type air treating device 34. A portion of the dust-eliminated air from the dust eliminating device 33 passes through this bypass passage 45.

A further partitioning wall 46 is provided for partitioning between the main area 1A and the empennage area 1B; and this partitioning wall 46 defines a main-wing area air inlet opening 48 for forcibly introducing the air of the main wing work area 6 by means of an air exhaust fan 47. In operation, the rearward air outlet from the main-wing air vent openings 41 and the air inlet through the above-desribed main-wing area air inlet opening 48 are combined to smoothly flow the ventilation air around the main wing 2b. With this, the system can effectively improve the working environment for those workers engaged in the works on the main wing 2b.

For conditioning the air to the empennage work area 18, there is provided a further air recycling device 49 for cleaning the exhaust air from the main wing work area 6 and then feeding it to the empennage work area 18. More specifically, as this recycling device 49, there is provided in the empennage area 1B aa dry filter device 49 for cleaning by filtering the exhaust air from the main-wing work area 6 introduced through the main-wing area air inlet opening 48.

A portion of the cleaned air cleaned by this dry filter device 49 is exhausted out of the hangar through an empennage area air exhaust passage 50. The remaining portion of the cleaned air is guided through a relay passage 51 to an empennage area air conditioning device 52, which again eliminates dust from and conditions the temperature of the air to feed it through an air feed fan 53 and an air feed passage 54 to an empennage area air vent opening 55.

The empennage area air conditioning device 52 receives, in addition to the portion of the cleaned air from the dry filter device 49, fresh ambience air introduced through an ambience air inlet passage 56 and then effects the dust eliminating operation and the temperature conditioning operation on these air combined. Thereafter, the device 52 feeds the conditioned air to the empennage work area 18. Accordingly, since the system cleans the exhaust air from the main-wing work area 6 and utilizes the heat retained in this exhaust air, the system can save consumption of energy needed for conditioning the temperature of the air to be fed to the empennage work area 18. Consequently, this empennage work area air conditioning device 52 may be of a compact, small-capacity type.

While the empennage area air vent opening 18 is disposed at an upper position in the empennage work area 18, the empennage area air inlet opening 57 for introducing the air in the empennage work area 18 is disposed at a lower position of the area 18 so as to be able to effectively achieve the improvement of the working environment. Further, the exhaust air which has been introduced from the empennage work area 18 through this air inlet opening 57 is cleaned by the above-described dry filter device 49 together with the exhaust air introduced from the main-wing work area 6 through the main-wing air inlet opening 48.

That is to say, after the exhaust air from the empennage work area 18 is cleaned by the dry filter device 49, a portion of this cleaned air is exhausted out of the system through the empennage area air exhaust passage 50 while the remaining portion of the cleaned air is recycled to the empennage area air conditioning device 52. With this, through the effective utilization of the heat remaining in the exhaust air from the empennage work area 18, the system can further save consumption of the energy needed for conditioning the air to be fed to the empennage work area 18.

In summary, the system of the present invention can save energy consumption in its air conditioning operation at each of the work areas 5, 6 and 18 through effective utlization of the heat remaining in the exhaust air. Accordingly, each of the air conditioning devices 24, 38 and 52 can be of a compact and small-capacity type. Consequently, the system can achieve significant conservation of energy in the entire hangar 1 as well as significant reduction in the entire system installation costs.

Like the inner wall 19 and the working table moving mechanisms 20, 21, 22 and 23 desribed hereinbefore, the right and left partition walls 46 each defining the main-wing area air inlet opening 48, the right and left dry filter devices 49 and the right and left empennage area air conditioning devices 52 are provided independently at the right and left sections 1b constituting the empennage area 1B. Accordingly, for moving the fuselage 2a and the main wing 2b into and out of the main area 1A, these right and left pairs of the partition walls 46, the dry filter devices 49 and the empennage area air conditioning devices 52 are moved independently together with each section 1b.

Figure 11:
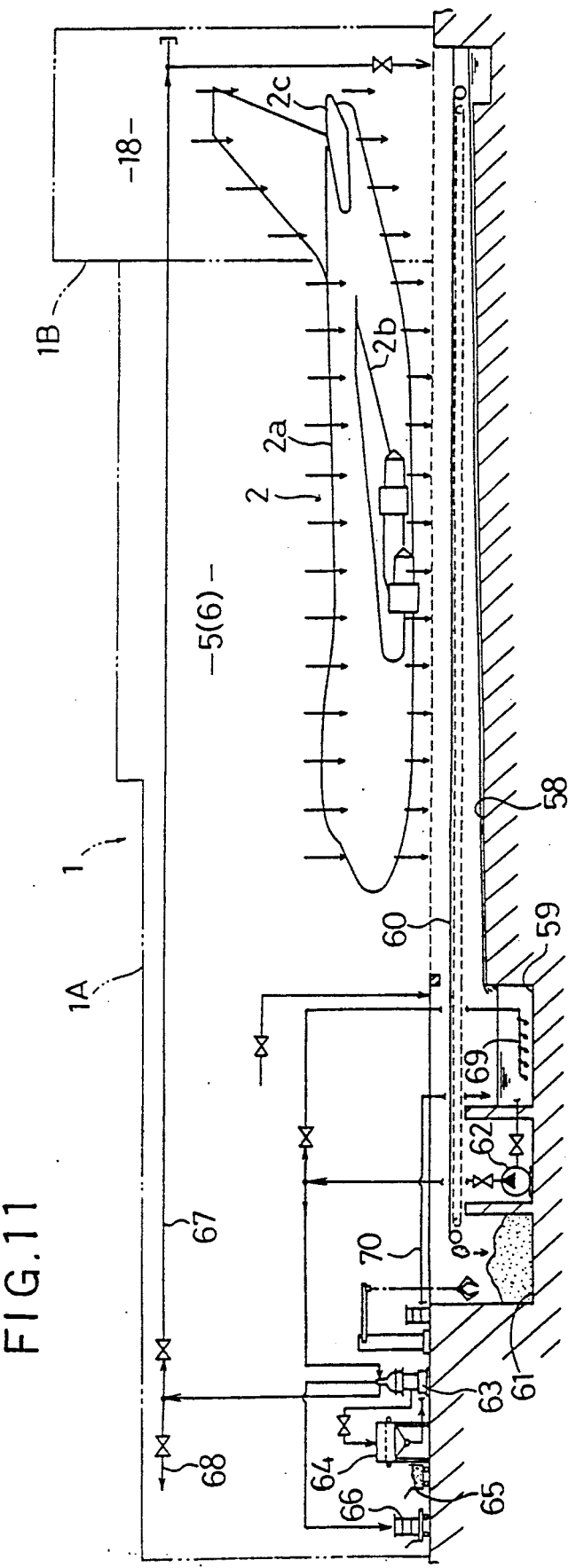
Figure 3:
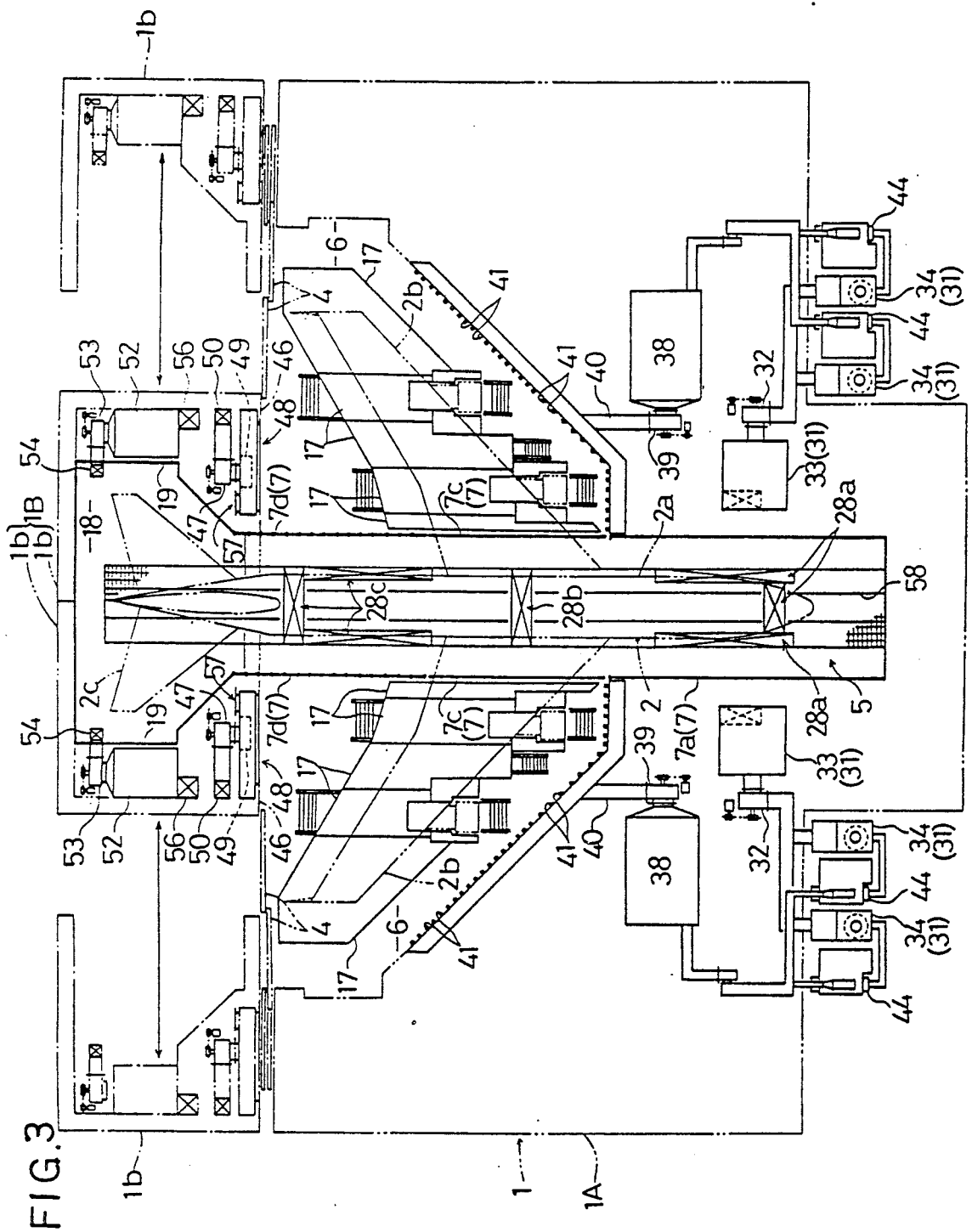
Figure 4:
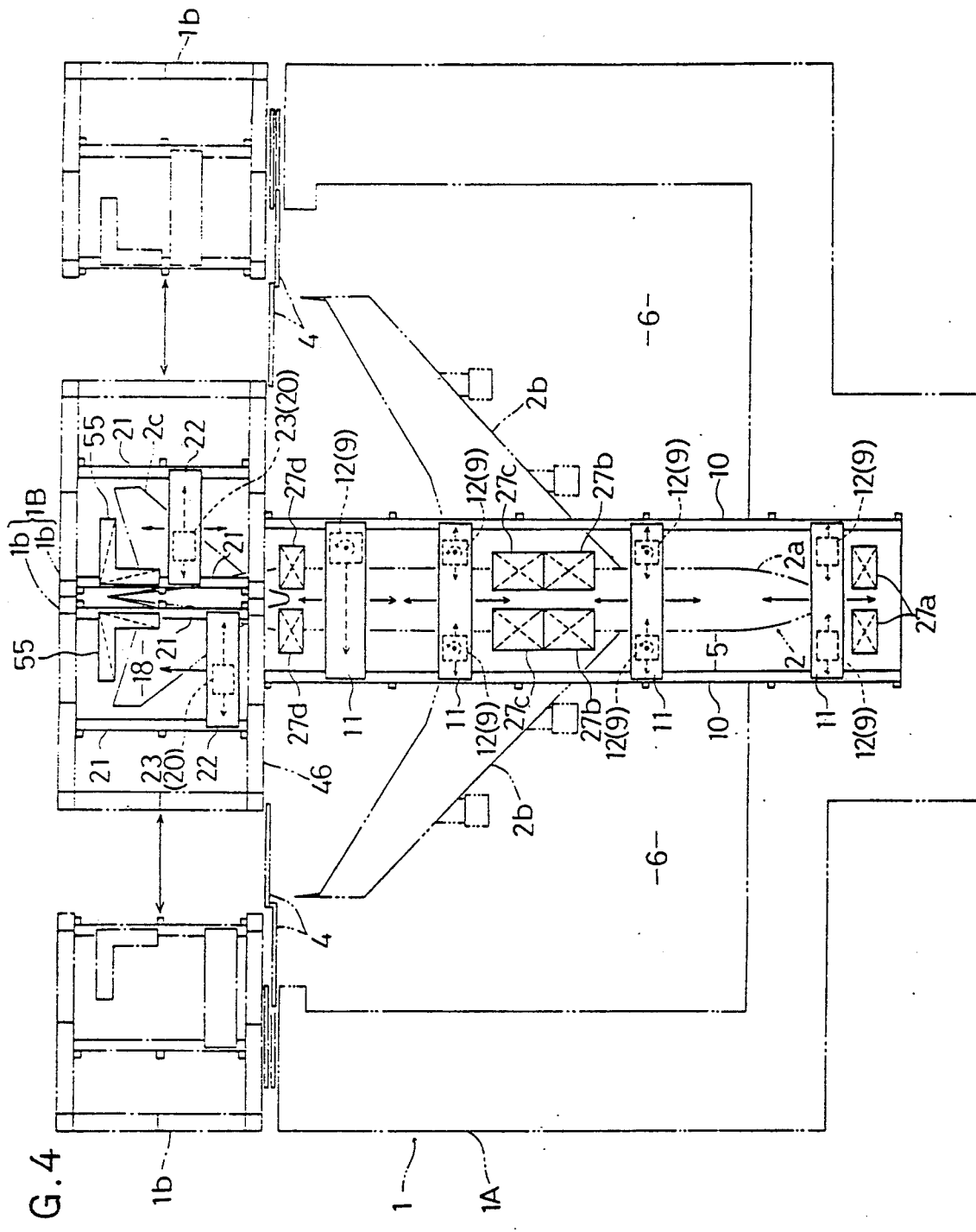
Figure 7:
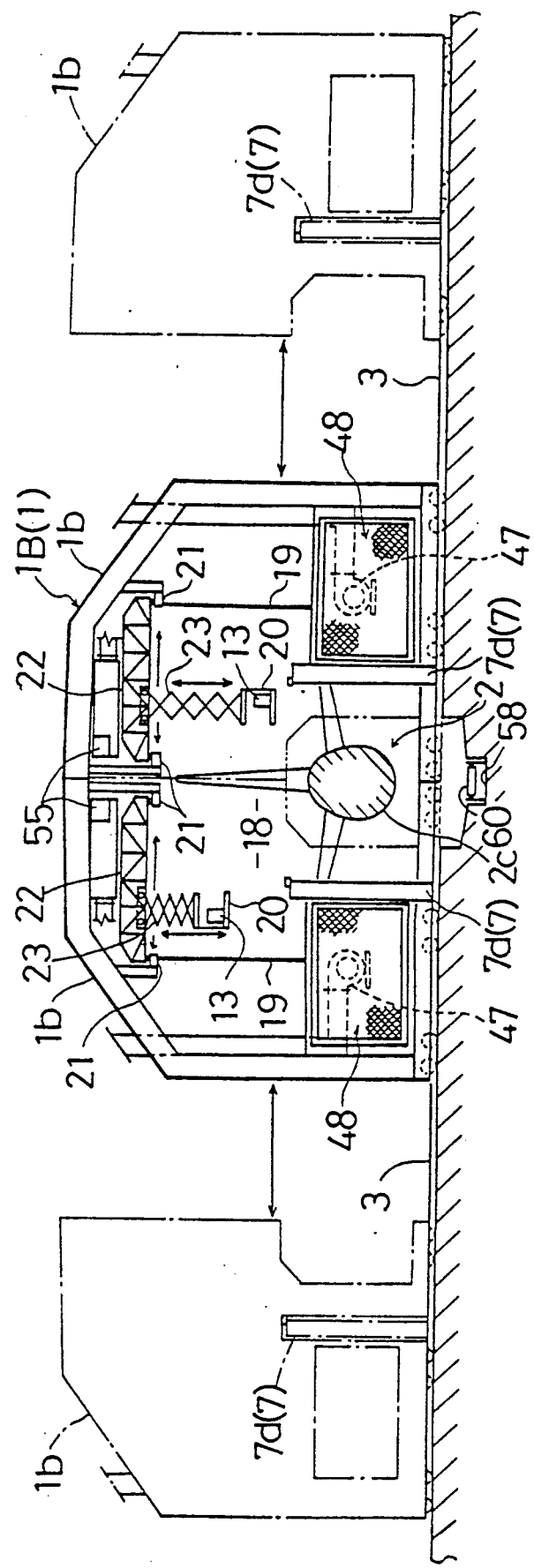

At the floor zones of the fuselage work area 5 and of the empennage work area 18, as shown in FIG. 11, there is provided one continuous paint-collecting groove 58 extending from the front end of the fuselage work area 5 to the rear end of the empennage work area 18. More particularly, before a re-painting operation is effected on the fuselage 2a and the empennage 2c, the old paint on these aeroplane portions has to be peeled off by using a paint-peeling liquid and then the peeled paint sludge must be flushed away in cleaning water. For this purpose, the flush cleaning water is caused to flow at the paint-collecting groove 58 and collected at a water tank 59 disposed at a downstream end of the groove 58.

The above-described paint-collecting groove 58 incorporates a sludge-collecting filter conveyer 60 extending through the entire length of the groove 58, so that the filter conveyer 60 cleans the water running at the groove 58 by filtering the sludge entrapped in the water.

The paint sludge collected by the filter conveyer 60 is conveyed on this conveyer and collected at a sludge tank 61. Thereafter, the collected sludge is appropriately disposed of by a sludge disposing system provided separately from the air conditioning system.

On the other hand, the cleaning water collected at the water tank 59 is conveyed by a pump 62 to a centrifugal-force separator 63, so that the separator 63 separates and eliminates any remaining paint sludge and oil substance contained therein. Then, this paint sludge separated by the separator 63 is dehydrated by a sludge filtering device 64 and then conveyed to the aforementioned sludge disposing system. Whereas, the oil substance separated also by the separator 63 is collected at a collector container 66.

A portion of the cleaning water having its paint sludge and oil substance eliminated by the separator 63 is fed through a recycling passage 67 to the upstream end of the paint-collecting groove 58 to be re-used as the flush cleaning water at the groove 58.

The remaining portion of the above cleaning water is conveyed through a water exhaust passage 68 to an exhaust water disposing system to be appropriately disposed of thereby.

The water tank 59 incorporates a nozzle device 69 for recycling by discharging a portion of the cleaning water pumped out by the pump 62 back into this tank 59. This water discharging operation by the nozzle device 69 stirs the tank water thus effectively preventing precipitation and accumulation of the sludge inside the tank 59.

A reference numeral 70 in the drawings denotes a water recycling passage for recycling the cleaning water collected from the paint sludge by the sludge filtering device 64 back to the water tank 59.

Some other embodiments of the invention will be specifically described next.

(A) The specific construction and material of the partition wall 7 partitioning between the fuselage work area 5 and the main wing work area 6 can vary conveniently. For instance, a cloth material can be used for forming the partition wall 7.

Further, the specific construction for moving the partition wall 7 for allowing entrance and exit of the aeroplane 2 can vary depending on the convenience.

(B) In the foregoing embodiment, the exhaust air from the fuselage work area 5 is cleaned by the recycling device 31 and then this cleaned air is fed as the recycling air to the main wing work area 6. Alternately, the reverse arrangement is also conceivable so that the exhaust air from the main wing work area 6 is cleaned by the recycling device 31 and this cleaned air is recycled to the fuselage work area 5.

(C) The exhaust-air cleaning construction of the recycling device 31 can be of various types.

(D) In the foregoing embodiment, the air cleaned by the recycling device 31 has its temperature conditioned by means of the separate air conditioning device 38 before feeding it to the other work area 6. Alternately, this second temperature conditioning operation can be eliminated.

(E) It is conceivable to form flexible a portion of the partition wall 7 corresponding to an upper surface of the main wing so that the wall portion comes into gapless contact with the upper surface of the main wing. Similarly, it is conceivable to form elastic a portion of the partition wall 7 corresponding to a lower surface of the main wing for the same purpose. These will further improve the partitioning effect of the partition wall 7.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An air conditioning system for use in an aeroplane hangar, the system comprising:
   a hangar including a fuselage work area for works on a fuselage of an aeroplane and a main-wing work area for works on a main wing of the aeroplane;
   a partition wall for partitioning between said fuselage work area and said main-wing work area;
   an air conditioning device for conditioning temperature of air to be fed to either of said work areas; and
   recycling means for cleaning air exhausted from said either work area and feeding a portion of the cleaned air to said air conditioning device while feeding the rest of the cleaned air to said other work area.

2. An air conditioning system as defined in claim 1, wherein said hangar includes a main area for receiving a fuselage and a main wing of the aeroplane and an empennage area disposed adjacent an entrance to said main area so as to receive an empennage of the aeroplane.

3. An air conditioning system as defined in claim 2, wherein said empennage area has a greater height than said main area and is widthwise divided into two sections.

4. An air conditioning system as defined in claim 3, wherein said partition wall is movable between a partitioning position where said partition wall is positioned across said fuselage through an entire length thereof and a retracted position where said partition wall is retracted for allowing unobstructed entrance and exit of the aeroplane.

5. An air conditioning system as defined in claim 4, wherein one component of the air cleaned by said recycling device is exhausted out of the system, another component is recycled to said air conditioning device and the remaining component is guided to a main-wing area air conditioning device which effects dust eliminating operation and temperature conditioning operation on this component to feed it to said main wing work area.

6. An air conditioning system as defined in claim 5, wherein said main-wing air conditioning device receives, in addition to the cleaned air from said recycling device, fresh ambience air introduced through an ambience air inlet passage, with these airs being combined together; said main-wing air conditioning device effecting the dust eliminating operation and temperature control operation on this combined air flow to feed it to said main wing work area.

7. An air conditioning system as defined in claim 6, wherein said main-wing air conditioning device feeds the air through a main-wing area air vent opening only to the vicinity around said main wing in a concentrated manner.

8. An air conditioning system as defined in claim 7, wherein a further partition wall is provided between said main area and said empennage area, said further partition wall defining a main-wing area air inlet opening for forcibly introducing the air of said main wing work area; an air intake through said air inlet opening and an air outlet through said main-wing area air vent opening cooperating to produce a rearward air flow around said main wing.

9. An air conditioning system as defined in claim 2, wherein inside said hangar an empennage work area is provided for effecting works on an empennage of the aeroplane and a further air conditioning device is provided for cleaning exhaust air from either said fuselage work area or said main wing work area and feeding it to said empennage work area.

10. An air conditioning system as defined in claim 9, wherein said further air conditioning device comprises a dry filter device.

11. An air conditioning system as defined in claim 10, wherein a portion of the air cleaned by said dry filter device is exhausted out of the system and the remaining portion of the air is guided to an empennage area air conditioning device which effects dust eliminating operation and temperature conditioning operation on said remaining air portion to feed it through an empennage-area air outlet opening to said empennage work area.

12. An air conditioning system as defined in claim 11, wherein said empennage area air conditioning device receives, in addition to the portion of the cleaned air from said dry filter device, fresh ambience air introduced through an ambience air inlet passage and then effects the dust eliminating operation and the temperature conditioning operation on these air combined to feed it to said empennage work area.

* * * * *